United States Patent Office 3,499,032
Patented Mar. 3, 1970

3,499,032
HYDROXYL-, MERCAPTO-, AND AMINO-
SUBSTITUTED AMINIMIDES
Lawrence M. Clemens and William J. McKillip, Minneapolis, and Edward A. Sedor, Bloomington, Minn., assignors to Ashland Oil & Refining Company, Houston, Tex.
No Drawing. Filed Apr. 25, 1967, Ser. No. 642,276
Int. Cl. C07c 103/44
U.S. Cl. 260—561    6 Claims

ABSTRACT OF THE DISCLOSURE

Aminimides are prepared from cyclic derivatives, such as lactones, lactams or sulfams. The aminimides have the general formula:

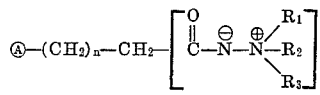

wherein Ⓐ is hydroxyl, amino, or mercapto; $R_1$ to $R_3$ are aliphatic, except allylic, or aryl, except benzylic, hydrocarbon radicals having from 1–10 carbon atoms or radicals in which $R_1$ and $R_2$ are combined to form heterocyclic rings with the nitrogen; and $n$ is an integer of 1–3.

---

The present invention relates to novel aminimides. In another aspect, this invention relates to the preparation of aminimides substituted with hydroxyl, amino or mercapto groups. In another aspect, this invention relates to a method of preparing isocyanates from the hydroxyl-, mercapto-, or amino-substituted aminimides.

A method of producing aminimides by reacting an organic ester with a hydrazinium salt in the presence of a strong base and polar solvent (e.g. t-butyl alcohol or isopropyl alcohol) is described in co-pending application Ser. No. 514,705, filed Dec. 17, 1965. This process makes possible the preparation of various aminimides which were, prior to the filing of the application, unknown. The aminimides produced by the method of the co-pending application may be pyrolytically rearranged to produce isocyanates by a method reported by Dr. Stanley Wawzonek of the University of Iowa.

The present invention provides new aminimides using a process quite similar to that disclosed in Ser. No. 514,705. These aminimides are easily converted to the corresponding isocyanates by pyrolytic rearrangement. The isocyanates produced by the pyrolytic rearrangement are self-polymerizing in that they contain either a hydroxyl, an amino, or a mercapto group which would react with the —NCO group of the isocyanate.

The aminimides of the present invention have the general formula:

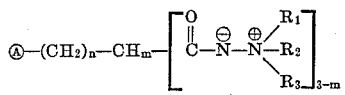

wherein Ⓐ is hydroxyl, amino, or mercapto; $R_1$ to $R_3$ are aliphatic, except allylic, or aryl, except benzylic, hydrocarbon radicals having from 1–10 carbon atoms or radicals in which $R_1$ and $R_2$ are combined to form heterocyclic rings with the nitrogen; and $n$ is an integer of 1–3. The term "aryl" as employed herein is meant to define an aromatic radical in which the unsatisfied valence is at a carbon atom of the aromatic nucleus.

The aminimides are prepared by reacting a hydrazinium salt and a cyclic derivative selected from the group consisting of lactones, lactams, and sulfams in the presence of a base in accordance with the following reaction:

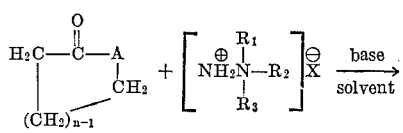

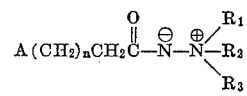

wherein Ⓐ, $R_1$ to $R_3$, $n$ have the above-indicated meanings. The base is preferably a strong base, such as a metal alkoxide. (Solvent is preferably a polar solvent such as t-butanol, acetonitrile, isopropanol or dimethyl sulfoxide.)

The hydrazinium salt employed in the formation of the aminimide can be obtained by the reaction of an unsymmetrical hydrazine and a quaternizing agent having the formula:

$$R_3X$$

wherein $R_3$ has the above-indicated meaning and X is halogen (e.g., chlorine, bromine or iodine or tosylate). The reaction of the unsymmetrical hydrazine with the quaternizing agent can be conducted (in the absence of a solvent if a homogeneous liquid mixture of the reagents can be formed) or in the presence of a diluent which is generally a non-polar solvent such as benzene or a polar solvent, such as t-butanol, isopropanol, methanol or ethanol. The reaction temperature can vary from room temperature to elevated temperatures which do not cause decomposition of the reagents or products. Generally, the reaction is carried out at elevated temperatures, e.g., 50° to 100° C.

The hydrazinium salt is then reacted with a cyclic ester in the presence of a base and, preferably, in the presence of a polar solvent to produce the aminimide. The reaction mixture is then evaporated and the aminimide can be extracted with a suitable solvent or with the reaction solvent which does not cause appreciable solution of the by-product of the cation of the base with the anion of the quaternary salt.

Various methods can be employed to purify the resulting aminimide, such as extraction followed by crystallization or precipitation, evaporation, and chromatographic separation.

The reaction of the cyclic derivative with the hydrazinium salt is preferably carried out in a polar solvent, such as t-butanol, dimethyl sulfoxide, acetonitrile, dioxane, THF and the like. The reaction temperature is generally maintained in a range between 0 and 100° C., preferably at about the boiling point of the mixture. Generally, the reaction is carried out at atmospheric pressure. The time of reaction is about ½ to 30 hours. An excess of cyclic derivative may be employed in order to assure reaction of all of the hydrazinium salts. However, in view of the nearly quantitative yields which can be obtained, it may be preferable to use nearly equivalent amounts of lactone, lactam or sulfam and hydrazinium salt.

Cyclic derivatives which can be employed to form the aminimides have the general formula:

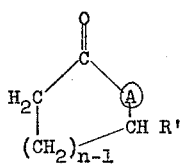

wherein $n$ and A have the above-indicated meanings and R' is an alkyl group of 1 to 10 carbon atoms. The divalent radical A can be hydroxy, amino (including alkyl amino), or mercaptyl. The A group remains unchanged throughout the reaction to form the aminimide and also is unchanged in the final isocyanate. Examples of cyclic derivatives which are operable in the present invention are $C_3$–$C_6$ lactones, $C_3$–$C_6$ lactams, and $C_3$–$C_6$ sultams. Particularly preferred cyclic esters are butyrolactone and capyrolactone.

The unsymmetrical hydrazine, which can be employed in combination with a quaternizing agent to form hydrazinium salts which, in turn, are reacted to form aminimides, has the general formula:

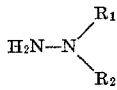

wherein $R_1$ and $R_2$ have the above-indicated meanings. Preferably, $R_1$ and $R_2$ are lower alkyl groups, phenyl and substituted phenyl groups, and such heterocyclic ring compounds have pyrrolidine, pyrrole, pyrroline, and piperidine. Specific examples of the unsymmetrical hydrazine employed to form the hydrazinium salt include dimethyl hydrazine, diethyl hydrazine, methylethyl hydrazine, dibutyl hydrazine, n-amino-2-phenyl pyrrolidine, N-amino-2-phenyl pyrroline, diphenyl hydrazine, dicresol hydrazine and methylphenyl hydrazine.

The quaternizing agent, which can be employed in the formation of the hydrazinium salt, is usually halogenated (i.e., substituted with chlorine, bromine or iodine); however, non-halogen radicals capable of forming the anion of the quaternary salt may replace the halogen groups. Examples of suitable quaternizing agents, therefore, include methyl chloride, ethyl chloride, methyl iodide, isopropyl chloride, ethyl bromide, cresyl iodide, phenylmethyl sulfonate, methyl toluene sulfonate, and ethyl toluene sulfonate.

Bases which can be used in the process of this invention include the strong inorganic and organo-metallic bases, such as alkali and alkaline earth metal alkoxides. Other bases which can be used are the organo-alkali compounds such as the alkyl lithiums, alkyl sodiums and alkyl potassiums. Particularly preferred bases are the sodium alkoxides, e.g., sodium methoxide, and sodium isopropoxide.

The reaction between the cyclic ester and the hydrazinium salt is preferably conducted in a polar solvent. Typical solvents are t-butanol, dimethyl sulfoxide, dioxane, tetrahydrofuran, glymes (i.e., dimethyl ethers of ethylene glycol) and the like. The solvent is added in an amount sufficient to disperse the reactants and an amount sufficient to render the solution easy to handle.

The novel aminimides which can be prepared by reacting the above-described reagents in the foregoing reactions include trimethylamine-4-hydroxybutyrimide, trimethylamine-4-aminobutyrimide, trimethylamine-4-mercaptylbutyrimide, trimethylamine-4-hydroxycapyrimide, trimethylamine-4-aminocapyrimide, trimethylamine-4-mercaptylcapyrimide, and the like.

It is understood that the trimethylamine groups in the above-specific aminimides can be replaced with triethyl, tributyl, tripropyl, tripentyl, etc., and the diethylmethyl, dimethylethyl, dibutylmethyl, dimethylbutyl, etc., depending upon the particular reactants chosen. It is also understood that the buty- and the capy-groups can be substituted by propy- and amy-groups.

The principal utility of the aminimides of the present invention resides in their active hydrogen functionality. Rearrangement to isocyanates is accomplished by pyrolysis. The reaction can be illustrated as follows:

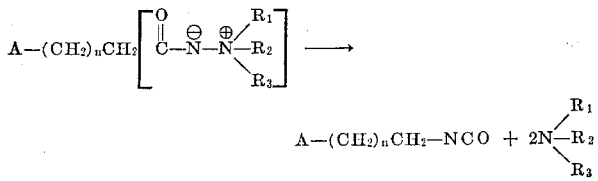

wherein $n$, A, and $R_1$ to $R_3$ have the above-indicated meanings. The tertiary amine by-products are well-known catalysts in the polymerization of isocyanates with hydroxyl-, amino-, or mercaptyl-containing materials.

Pyrolysis of the aminimides can be conducted by heating the aminimide to temperatures above about 150° C., and results in the formation of the isocyanate and a tertiary amine by the above equation.

Since the aminimides of this invention contain either the hydroxyl, mercaptyl, or amino functionality, and further since they are stable at room temperatures, they can be used to give rise to a one-component, one-package polyurethane, polyurea, or polythiourea system which even includes the polymerization catalyst. This system is stable until the mixture is decomposed by heating to elevated temperatures upon which polymer formation takes place. Although the foregoing utility is particularly valuable, it is to be understood that the isocyanates derived from the aminimides can also be employed in other applications heretofore developed for isocyanates.

The formation of the aminimides and the resulting isocyanates and urethane is further illustrated by the following examples in which all units of quantity are by weight unless otherwise stated.

EXAMPLE I

This example illustrates the preparation of trimethylamine-4-hydroxybutyrimide from butyrolactone.

Into a round-bottomed, three-necked flask equipped with a stirrer, reflux condenser, and thermometer, were placed 8.6 g. (0.1 mole) of butyrolactone and 100 ml. of t-butanol. To the resulting reaction mixture was added 11.1 g. (0.1 mole) of finely-ground 1,1,1-trimethylhydrazinium chloride after which the mixture was stirred. While stirring the mixture, 5.4 g. (0.1 mole) of sodium methoxide were added. The sodium methoxide addition resulted in an immediate exotherm (47° C.). Then, the mixture was refluxed with stirring for 22.5 hours. At the end of the reaction time the mixture was slightly basic.

Solvent was removed on a rotary evaporator and the resulting light solid residue was treated with anhydrous methanol and filtered through filter-aid. The resulting filtrate was evaporated to dryness. The white residue was extracted with ethylacetate several times yielding 5.95 g. (32.2%) of crude aminimide.

The crude aminimide was sublimed at 90° C. at about 1 mm. Hg yielding white crystals with a melting point of 105–107.5° C.

The structure of trimethylamine-4-hydroxybutyrimide was confirmed by infra-red and by micro-analysis.

*Analysis.*—Calculated for $C_7H_{16}N_2O_2$. C, 52.47%; H, 10.07%; N, 17.49%. Found: C, 52.56%; H, 10.31%; N, 17.47%.

EXAMPLE II

The aminimide of Example I is heated to 200 to 225° C. and a quantitative evolution of trimethylamine is obtained. Analysis of the resulting polymer confirmed the conversion of aminimide groups to isocyanate groups. The isocyanate so produced is homopolymerized to form a urethane.

EXAMPLES III AND IV

These examples illustrate the preparation of trimethylamine - 4 - mercaptobutyrimide and trimethylamine - 4-aminobutyrimide by the method of Example I.

Butyrolactam in t-butanol is reacted with 1,1,1-trimethylhydrazinium chloride in the presence of sodium methoxide by the process outlined in Example I. After removing solvent, treatment with methanol and filtering, the filtrate is evaporated to dryness leaving a residue which is found to be trimethylamine-4-aminobutyrimide.

Likewise, butyrosulfam in t-butanol is reacted with 1,1,1-trimethyl-hydrazinium chloride in the presence of sodium methoxide to yield a product which is trimethylamine-4-mercaptobutyrimide.

The foregoing examples have illustrated the preparation and polymerization of the novel aminimides. It will be apparent that other aminimides included within the scope of the present invention can be similarly employed in specific procedures illustrated in the examples. Since many variations and embodiments are apparent, it is not intended to limit the disclosure to the particular features shown.

We claim:
1. An aminimide having the formula:

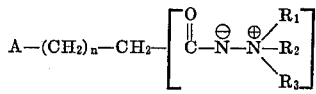

wherein A is a hydroxyl, amino or mercapto group; $R_1$ to $R_3$ are lower alkyl or phenyl and $n$ is an integer of 1–3.

2. The aminimide of claim 1 wherein $R_1$, $R_2$ and $R_3$ are methyl.
3. The aminimide of claim 1 wherein A is hydroxyl.
4. The aminimide of claim 1 wherein $n$ is 2.
5. Trimethylamine-4-hydroxybutyrimide.
6. The aminimide of claim 1 wherein $n$ is 3.

References Cited

UNITED STATES PATENTS 3,410,880   11/1968   Brocklehurst _____ 260—404.5

ALEX MAZEL, Primary Examiner

J. A. NARCAVAGE, Assistant Examiner

U.S. Cl. X.R.

260—77.5, 294, 326.3, 453, 562